Aug. 11, 1931.  H. A. DOUGLAS  1,817,974
INTERNAL COMBUSTION ENGINE POWER PLANT
Filed June 14, 1929   2 Sheets-Sheet 1
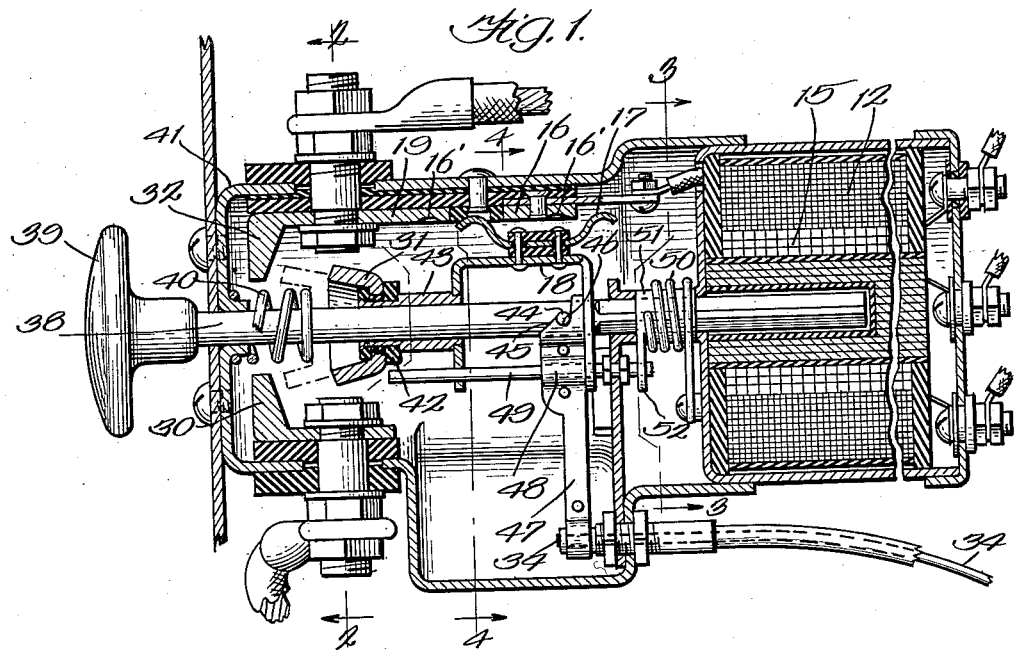
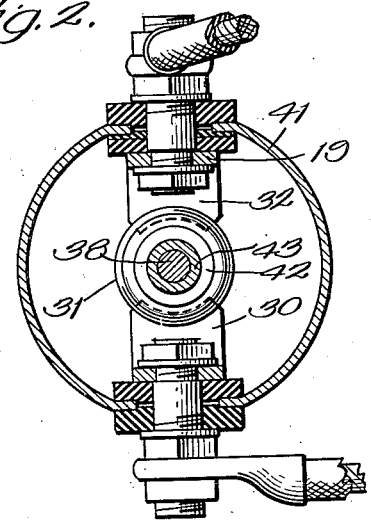
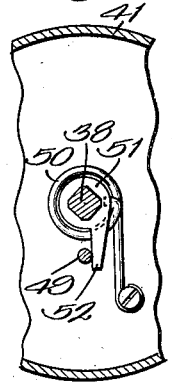
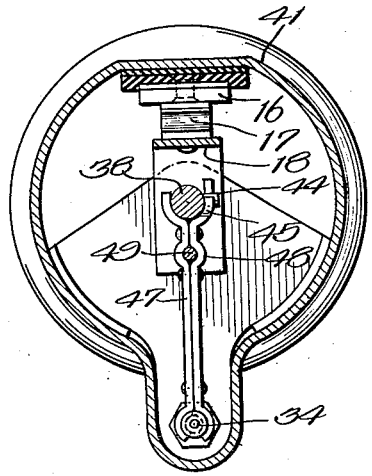
Inventor:
Harry A. Douglas

Fig. 5.

Patented Aug. 11, 1931

1,817,974

UNITED STATES PATENT OFFICE

HARRY A. DOUGLAS, OF BRONSON, MICHIGAN

INTERNAL COMBUSTION ENGINE POWER PLANT

Application filed June 14, 1929. Serial No. 370,866.

My invention relates to power plants employing internal combustion engines and has for its general object the simplification of the mechanism which is employed for controlling the ignition circuit, the circuit of the starting motor, and the throttle or choke valve which regulates the supply of air to the carburetor.

In accordance with one feature of the invention the switching mechanism which is in controlling relation with the ignition circuit has an operating means that is also in controlling relation to the valve.

In accordance with another feature of the invention the switching mechanism which is in controlling relation with the circuit of the starting motor has an operating means that is also in controlling relation to the valve.

In accordance with another feature of the invention the switches which control the ignition circuit and the circuit of the starting motor have a common operating element. This common operating element, in the preferred embodiment of the invention, is also in controlling relation to the throttle or choke valve. The two switches and the throttle valve mechanism are so related with each other and with the common element, preferably a plunger, that operates them that the various operations employed in starting the engine and maintaining it in operation are performed in proper relation and in orderly sequence.

The invention will be more fully explained in connection with the accompanying drawings in which Fig. 1 is a longitudinal sectional view illustrating the preferred embodiment of the invention; Fig. 2 is a sectional view on line 2—2 of Fig. 1; Fig. 3 is a sectional view on line 3—3 of Fig. 1; Fig. 4 is a sectional view on line 4—4 of Fig. 1; and Fig. 5 is a diagrammatic illustration of an automotive power plant equipped with apparatus of my invention.

My invention is particularly adapted for use in conjunction with the well known power plant illustrated in Fig. 5, though the invention is not to be thus limited. The power plant illustrated includes an internal combustion engine 1 which is in driving relation with the engine shaft 2. Such an engine is equipped with any well known or suitable carburetor such as that indicated at 3. Gasolene or other liquid fuel is supplied to the carburetor through the pipe 4 and the air which is to be carbureted is admitted at the air inlet 5. A throttle valve 6 is disposed in this air inlet to regulate the volume of air which is permitted to flow into the carburetor. The carbureted air is supplied to the manifold 7 and is there distributed to the cylinders. A throttle valve 8 governs the volume of carbureted air that flows through the manifold. The engine illustrated has four cylinders and each cylinder has a sparking plug 9. One terminal of each sparking plug is grounded and the other terminal is connected with the corresponding stationary contact 10. These stationary contacts are arranged in a circle upon whose center a distributing arm 11 turns to bring the contacts 10 successively into circuit with the spark plugs. The distributing arm 11 is in serial relation with the secondary or induced winding 12 of the transformer. This winding is grounded through the circuit interrupter 13. The contacts of the interrupter are shunted by a condenser 14. The primary 15 of the transformer has one terminal connected with one terminal of the transformer winding 12 and its other terminal connected with the stationary switch contact 16. A contact switch arm 17 is mounted, at its mid portion, upon a bracket 18. This bracket is movable into alternative positions, as will later more fully appear. In one of these alternative positions the arm 17 connects the contact 16 with another stationary contact 19 and in the other of these positions said switch arm is out of engagement with both of these contacts. The contact 19 is grounded through the storage battery 20, so that when the contacts 16 and 19 are bridged by the arm 17 the sparking transformer circuits are closed. After the transformer circuits have been established the shaft 2 is turned in order to start the engine. Any suitable starting means may be employed. The starting means illustrated is very well known and needs no description. However, it may be said that it is inclusive of a direct current electric motor 21 whose shaft 21' is threaded. A sleeve 22 is threaded upon the shaft so as to be movable along the same to a limited extent. This sleeve has a portion thereof in the form of a pinion 23, this pinion and the balance of the sleeve being spaced apart by a flange 24 that is provided upon the sleeve. An abutment 25 is arranged to limit the extent to which the sleeve 22 is moved by the shaft 21' when this shaft is set into rotation by the motor 21. A coiled spring 26 is anchored, at one end, to a collar 27 which is loose upon the shaft 21', and at its other end to the sleeve 22. The pinion 23 is brought into and out of mesh with a gear 28 that is fixed upon and coaxial with the engine fly-wheel 29. When the ignition circuit of the engine has been closed the circuit of the starting motor 21 is closed in order to "crank" the engine. The starting motor circuit is traceable from the grounded motor 21 through the stationary switch contact 30, the movable switch contact 31 and the stationary contact 32 which is preferably integrally formed with the contact 19, and is consequently grounded through the battery 20. While the engine is being started by the motor 21 the air supplied to the carburetor is limited or choked to the desired extent to suitably enrich the mixture for starting the engine. This "choking" is effected by the throttle valve 6 and the mechanism that governs the position of this valve. This valve governing mechanism is inclusive of an arm 33 which is fixed upon the shaft of the throttle valve 6, a wire 34 which is in sliding connection with the outer end of said arm and which carries a collar 35 adapted to engage the upper end of the arm 33 and move the arm in a counterclockwise direction when the wire is correspondingly pulled, and a coiled spring 36 which serves to maintain the arm 33 in engagement with the collar 35. Because of a condition in another part of the apparatus, which will be later described, the wire 34 free to be moved to bring the collar 35 beyond and out of engagement with the arm 33 when this arm has been brought into engagement with a stop 37, this engagement being established when the throttle valve is wide open.

The instrumentalities that govern the ignition circuit, the control valve 6 and the circuit of the starting motor are embraced in one unitary mechanism having a common controlling element which will operate the aforesaid mechanisms in orderly relation and sequence. The common controlling element is preferably in the form of a plunger 38 having a knob 39 thereon which is pressed upon to press the plunger into its innermost position. In this position the circuits that include the battery 20 are opened and the power plant is idle, as will more fully appear. The plunger is drawn by hand from its innermost position to its extreme outermost position. During this outward movement of the plunger, the contacts 16 and 19 are connected to close the ignition circuit and subsequently contacts 30 and 32 are bridged by the contact 31 of the motor as will more fully hereafter appear. A coiled spring 40 surrounds the plunger 38 and bears against one end wall of the casing 41 that encloses the switching mechanism that is governed by the plunger. The other end of this spring is separably engagable by an insulating collar 42 which is carried by a sleeve 43 that surrounds the plunger 38, this plunger being movable longitudinally with reference to the sleeve and also rotatable with respect thereto. The bracket 18 is fixed upon the sleeve 43 and the contact 31 is also fixed upon this sleeve, but through the intermediation of the insulating collar 42. When the plunger 38 is being pulled from its innermost position to its outermost position, the sleeve 43 is held in fixed connection therewith. Means for establishing this fixed relation of this sleeve and the plunger is desirably inclusive of a pin 44 upon the plunger, a camming formation 45 and a notch formation 46, the formations 45 and 46 being desirably provided upon the upper end of a bar 47 whose lower end is coupled with the throttle operating link or wire 34. This bar is bifurcated at its upper end to partially embrace the plunger 38 which thus takes part in positioning this bar, said bar being also formed with a sleeve portion 48 which embraces the guiding rod 49, that is parallel with the plunger 38, this guiding rod and plunger thus cooperating to maintain said bar in a fixed plane. A coiled spring 50 has one end anchored to a casing wall and its other end anchored to a sleeve 51 which is splined upon the plunger 38. The sleeve 51 may therefore have a fixed plane of rotation, so that the plunger may move back and forth therethrough, but which sleeve has a turning effect upon the plunger in a direction normally to maintain the pin 44 in the notch 46. The sleeve 51 has a finger 52 that engages rod 49 to limit the extent to which the spring 50 may turn the plunger when the pin is out of the notch 46, whereby this pin is then held in register with the cam 45 that is employed to guide the pin back into the notch. When the plunger is in its innermost position, the bar 47 is in engagement with the right hand side of the U-shaped bracket 18. When the plunger is in its outermost position, said arm is in engagement with the left hand side of said bracket. The arm may also be adjusted to spaced apart relation to both sides of the bracket at the same time. When the plunger is in its innermost position, Fig. 1, the mechanisms governed thereby are idle. In being pulled from this innermost position to its outermost position the pin 44 carries the arm 47 to the left with the result that the throttle 6 is first brought to a closed or choking position. The closure of the ignition circuit occurs subsequently owing to the fact that the arm 47 is in lost motion relation with the switch contact 17 and the bracket 18 that carries the switch arm. After the throttle 6 has been brought to a choking position the arm 47 is brought into engagement with the left hand side of the contact support 18, the engagement of the switch contact 17 with the contacts 16 and 19 then ensuing to establish the ignition circuit. After the ignition circuit is thus closed the bridging contact 31 is engaged with the contacts 30 and 32 to close the circuit of the starting motor 21. After the initial establishment of the ignition circuit a concluding portion of the outward movement of the plunger 38 brings the spring 40 under compression. After this spring has been partially placed under compression, the contact 31 engages the contacts 30 and 32. The desired full compression of the spring is effected after the contact 31 has engaged the contacts 30 and 32, the plunger being pulled outwardly upon following the engagement of these contacts, so as to make such engagement firm. After the engine has been started the knob 39 is released permitting the spring 40 to move the contact 31 out of engagement with the contacts 30 and 32 whereby the circuit of the starting motor is automatically opened. When the spring 40 thus functions it also moves the bracket 18 a slight distance to bring the contact arm 17 into engagement with the notches 16'. Since the spring 40 directly defines the final circuit closing position of the switch arm with the ends of this arm in the notches 16' and since the bar 47 is in lost motion relation with the support 18 for said switch arm, it is apparent that the plunger may move the bar 47 through the intermediation of the pin 44 and notch 46 a distance corresponding to the space between this arm and the side of the bracket at the right of this arm in the adjustment of Fig. 5, thereby affording a range of operation for the throttle controlling link or wire 34 without disturbing the adjustment of the switch. In order that the switch may be opened without any obstruction from the wire or link 34 the lost motion connection between this wire and arm 33, which is illustrated in Fig. 5, is provided.

If it should be desired to start the engine without placing the throttle valve 6 to a choke position the plunger 38 is turned counterclockwise to disengage the pin 44 from the notch 46. Following this disengagement the wire 34 is uncoupled from the plunger, so that the throttle valve 6 is then relieved of the governed influence of the plunger, but without relieving this plunger of the control of the switching mechanism, which has been described. When the plunger 38 is thus turned counterclockwise motion therefrom to the support 18 is effected by the engagement of the pin 44 with one or the other of the sides of this support as the case may be. During the final operation of the movement to the left of the support 18 by the pin 44 the wire 34 is moved a very slight distance, but without turning the throttle 6 in a closing direction owing to the lost motion relation of the wire and the arm 33.

Changes may be made without departing from the invention.

Having thus described my invention, I claim:

1. The combination with an internal combustion engine having an electrical ignition circuit whose terminals are spaced apart, a motor in driving relation with the shaft of the engine to start the latter, a motor circuit whose terminals are spaced apart, a switch element carrier and switch elements mounted thereon movable in one direction to successively and directly electrically connect the terminals of the ignition and motor circuits, an operator, and means normally connected with the operator and engageable with said switch element carrier to impart circuit closing movement to the carrier from the operator.

2. The combination with an internal combustion engine having an electrical ignition circuit whose terminals are spaced apart, a motor in driving relation with the shaft of the engine to start the latter, a motor circuit whose terminals are spaced apart, a switch element carrier and switch elements mounted thereon movable in one direction to successively and directly electrically connect the terminals of the ignition and motor circuits, an operator in the form of a reciprocating plunger, and means normally connected with the operator and engageable with said switch element carrier to impart circuit closing movement to the carrier from the operator.

3. The combination with an internal combustion engine having an ignition circuit, and a throttle valve associated therewith, a switch element carrier and switch element mounted thereon movable in one direction to close the ignition circuit, an operator, and means connected with said valve and normally connected with the operator, said means having a lost motion connection with the switch element carrier effective during movement of the operator in one direction to close the valve when the switch element on the carrier is positioned to close the ignition circuit.

4. The combination with an internal combustion engine having an ignition circuit, and a throttle valve associated therewith, a switch element carrier and switch element mounted thereon movable in one direction to close the ignition circuit, an operator, and means connected with said valve and separably connected with the operator, said means having a lost motion connection with the switch element carrier effective during movement of the operator in one direction to close the valve when the switch element on the carrier is positioned to close the ignition circuit, the separable connection between said means and operator including an element fixed to the operator effective when said connection is separated to coact with the switch element carrier to operate the carrier to close the ignition circuit without coincident operation of the valve.

In witness whereof, I hereunto subscribe my name.

HARRY A. DOUGLAS.